United States Patent
So et al.

(10) Patent No.: US 8,356,158 B2
(45) Date of Patent: Jan. 15, 2013

(54) MINI-TRANSLATION LOOKASIDE BUFFER FOR USE IN MEMORY TRANSLATION

(75) Inventors: Kimming So, Palo Alto, CA (US); Jane Lu, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 2095 days.

(21) Appl. No.: 10/750,523

(22) Filed: Dec. 31, 2003

(65) Prior Publication Data

US 2005/0015569 A1  Jan. 20, 2005

Related U.S. Application Data

(60) Provisional application No. 60/487,425, filed on Jul. 15, 2003.

(51) Int. Cl.
*G06F 12/00* (2006.01)
*G06F 9/26* (2006.01)
*G06F 9/34* (2006.01)

(52) U.S. Cl. .................. 711/207; 711/205; 711/221

(58) Field of Classification Search ....... 711/6, 200–221
See application file for complete search history.

(56) References Cited

U.S. PATENT DOCUMENTS

| 5,500,948 | A | * | 3/1996 | Hinton et al. | 711/205 |
|---|---|---|---|---|---|
| 5,875,464 | A | * | 2/1999 | Kirk | 711/129 |
| 6,430,670 | B1 | * | 8/2002 | Bryg et al. | 711/216 |
| 6,446,187 | B1 | * | 9/2002 | Riedlinger et al. | 711/206 |
| 6,757,800 | B1 | * | 6/2004 | Estakhri et al. | 711/168 |
| 2004/0199714 | A1 | * | 10/2004 | Estakhri et al. | 711/103 |

OTHER PUBLICATIONS

Gerry Kane and Joe Heinrich; "Memory Management System;" 1992, Chapter 4, pp. 4-1 to 4-30; Prentice Hall; Englewood Cliffs, New Jersey.

* cited by examiner

*Primary Examiner* — Yaima Campos
(74) *Attorney, Agent, or Firm* — Thomas|Horstemeyer, LLP

(57) ABSTRACT

One or more methods and systems of improving performance and reducing the size of a translation lookaside buffer are presented. In one embodiment, the method comprises using a bit obtained from a virtual page number to store even and odd page frame numbers into a single page frame number field of a miniature translation lookaside buffer (mini-TLB). In one embodiment, even and odd page frame number fields are consolidated into a single page frame number field. In one embodiment, the mini-TLB facilitates the use of a buffer or memory of reduced size. Furthermore, in one or more embodiments, aspects of the invention may be found in a system and method that easily incorporates and adapts the use of existing control processor instruction sets or commands of a typical translation lookaside buffer.

33 Claims, 6 Drawing Sheets

Mini-TLB System: Mini-TLB, associated TLB registers, and Control Processor

--Prior Art--

Figure 1. TLB and TLB registers in the Base TLB architecture

Figure 2. 32-bit Virtual Address to a Mini-TLB

Figure 3. Mini-TLB System: Mini-TLB, associated TLB registers, and Control Processor Figure 4. TLBR Operation Figure 5. TLBWI or TLBWR Operation Figure 6. TLBP Operation

MINI-TRANSLATION LOOKASIDE BUFFER FOR USE IN MEMORY TRANSLATION

RELATED APPLICATIONS/INCORPORATION BY REFERENCE

This application makes reference to and claims priority from U.S. Provisional Patent Application Ser. No. 60/487,425, entitled "A Mini-TLB For Memory Translation", filed on Jul. 15, 2003, the complete subject matter of which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In a virtual memory system, the memory addresses used by a software program and the corresponding locations in the real memory are usually not the same. The portion of real memory, such as a random access memory (RAM), used by a program during an execution may not be identically addressed during subsequent executions. Because memory allocation is selected based on the memory space available in real physical memory, a software program will allocate portions of memory space based on its immediate processing needs.

Often, a virtual memory system allows a convenient mapping of virtual memory to that of real memory by way of partitioning memory into "pages" of various sizes. The mapping, or page translation, occurs by way of address translations using page table entries in one or more page tables that may be stored in one or more types of memory. For example, 4 kilobytes of virtual memory space may be mapped to 4 kilobytes of physical memory space. Since a control processor (i.e., central processing unit or CPU) requires quick access to the one or more page tables, these page table entries are implemented as close to the processor as possible, usually in the form of small page tables often referred to as translation lookaside buffers (TLBs). These TLBs contain the most recently used page translations. For example, a control processor's instruction fetch routines require a translation of virtual memory addresses to physical addresses; therefore, a translation lookaside buffer (TLB), is often implemented as one of the key components used by a control processor. The size of the "pages" that are accessed by the TLB may range from a few kilobytes to up to several megabytes in size. By accessing physical memory by way of the TLB, the physical memory location may be quickly determined when accessing data from memory. This facilitates the immediate access of data when a page hit occurs. Often, the TLB provides a translation of virtual addresses to physical memory addresses that is frequently used by the control processor. As a consequence, the CPU is able to process data more efficiently to improve overall performance of the computing system. Hence, the use of a TLB may have a significant role in implementing a virtual memory system.

Unfortunately, the methods used to access the page table entries in a TLB may not be very efficient. For example, the performance of the address translation may suffer based on how the TLB is addressed. Furthermore, the techniques currently used may require a TLB size that is larger than what may be required.

For example, a programmable TLB, as used in an exemplary MIPS architecture, is controlled by way of a set of control registers (e.g., TLB registers) and a set of instructions or commands. Furthermore, the page table entries are accessed using an addressing scheme that employs the use of odd and even pages (or page frames). Unfortunately, this scheme results in a less efficient way of accessing data required by the control processor (or CPU).

By performing address translation using both odd and even physical pages, the TLB size required for implementation may be unnecessarily large, resulting in increased fabrication costs of the manufacturer. This, of course, may have a significant effect on a manufacturer's costs.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide for a method, system and/or apparatus to reduce memory size of a translation lookaside buffer (TLB). Odd and even page frame numbers are stored and accessed as consecutive page frame numbers using a single page frame number field in the mini-TLB. This is accomplished by utilizing a bit obtained from an associated virtual page number of a virtual address. In one embodiment, a bit obtained from a virtual page number, such as the least significant bit of a virtual page number, is used to identify and store even and odd page frame numbers as consecutive page frame numbers using a single page frame number field of the mini-translation lookaside buffer (mini-TLB). In one embodiment, the mini-TLB is configured by way of a control processor instruction set. In one embodiment, the virtual page number of a 4 kilobyte page is defined by bits [31:12] of an exemplary 32 bit virtual address. In one embodiment, a page mask size ranges from 4 kilobytes to 16 megabytes while in another embodiment, the page mask size is 4 kilobytes. In one embodiment, storing and recalling the address translation data of the mini-translation lookaside buffer is facilitated by way of using one or more registers. In one embodiment, the registers comprise a page mask register, an entry Hi register, an entry Lo0 register, and an entry Lo1 register.

Aspects of the invention also provide for a method of improving performance of address translation of a TLB by using a bit from a virtual page number. The bit is used to store even and odd page frame numbers into a single page frame number field of the TLB. In one embodiment, the bit corresponds to the least significant bit of the virtual page number.

Additionally, aspects of the present invention may be found in a system to provide virtual to physical memory address translation of a translation lookaside buffer that utilizes an entry Lo0 register, an entry Lo1 register, and an entry Hi register, in which the least significant bit of a virtual page number of a virtual address to a TLB is used to select odd or even page frame numbers in a page frame number field.

Further aspects of the invention provide for a method of controlling a mini-TLB using the same commands that are used in controlling a TLB. The address translation provided by the mini-TLB allows any existing software operating on a TLB to be automatically adapted for use on the mini-TLB.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention may be found in a method and system to perform memory address translations to accomplish memory mapping for a control processor (i.e., a CPU) by way of a miniature version of a translation lookaside buffer (TLB). The miniature version of a TLB is termed a mini-TLB. The mini-TLB accomplishes odd/even page frame number translations by way of a single page frame number field instead of a dual page frame number field that is typically used in a TLB. In one embodiment, a mini-TLB facilitates the use of a decreased memory size in comparison to that used by a TLB. The address translation may be accomplished by using an existing control processor instruction set such as that provided by a MIPS control processor instruction set. In addition to using a TLB of reduced size, the system and method facilitates a more efficient and direct approach in performing virtual to physical memory address translation.

Aspects of the present invention provide performance improvements to one or more control processor virtual to physical memory addressing translation schemes. More specifically, aspects of the present invention obviate mapping virtual addresses into odd and even physical pages, thereby providing an effective way of addressing a translation lookaside buffer to facilitate improved CPU processing. A virtual page number of a virtual address to a TLB is mapped to a single page frame number field instead of two page frame number fields. Because TLB lookups are required for every instruction fetch and every load or store instruction, a simplified address translation scheme correlates to decreased lookup times, thereby providing significant improvement to overall control processing performance. For example, each virtual page number (VPN) entry, used by an exemplary MIPS R4000 or MIPS R5000 control processor, is typically associated with two consecutive page frame numbers that are mapped to two different page frame fields (PFN0 and PFN1) within the TLB. For example, two consecutive physical pages of physical memory, one even and one odd, are respectively mapped to two different address sections or fields within a typical TLB. Aspects of the present invention describe how the two page frame number fields (odd and even page frame numbers fields) are consolidated into a single page frame number field of a mini-TLB. A bit from a virtual page number (VPN) of a virtual address to a mini-TLB, such as the VPN's least significant bit (lsb), is used to map odd and even physical pages or page frames into a single page frame number field of the mini-TLB. By utilizing this technique, the mini-TLB utilizes significantly less buffer space.

Further aspects of the invention may be found in a system and method to utilize the same software, set of TLB instructions, or commands used in controlling a translation lookaside buffer (TLB). The one or more embodiments of the invention allow any software that is used to control and/or operate a TLB to be automatically adapted for use on the mini-TLB. The one or more embodiments may be compatible with and/or seamlessly adapted for use on one or more legacy (existing) systems utilizing any existing TLB instructions, software, or commands. The one or more embodiments may be compatible with any existing TLB registers used to control and/or operate the TLB.

Figure 1:
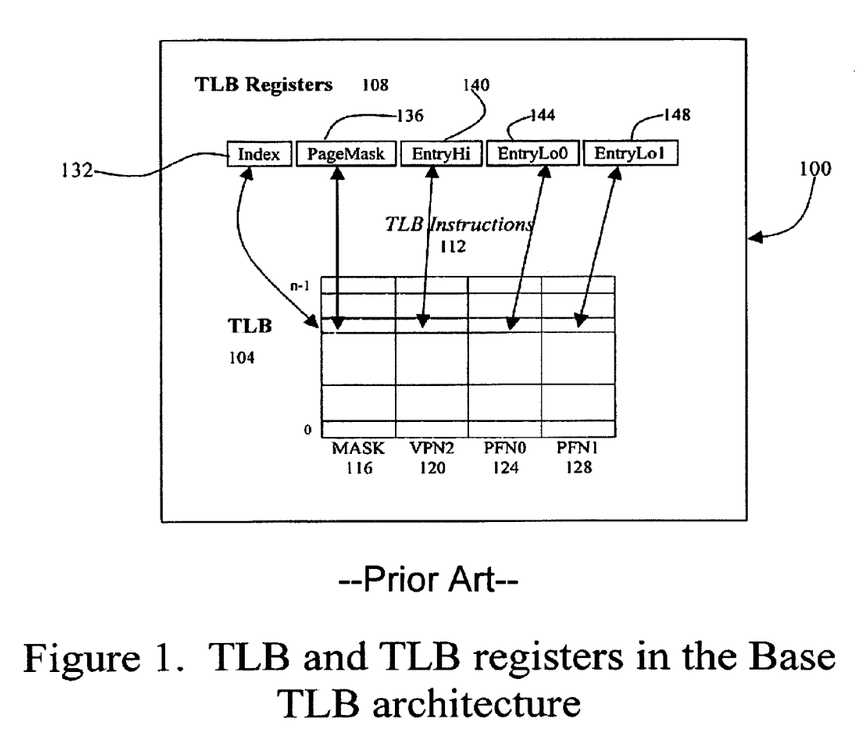
FIG. 1 is a block diagram of a typical translation lookaside buffer system comprising a translation lookaside buffer (TLB) and associated registers.

FIG. 1 is a block diagram of a typical translation lookaside buffer (TLB) system 100 comprising a translation lookaside buffer (TLB) 104 and its associated TLB registers 108. FIG. 1 may represent one or more typical TLB systems. The functionality and operation of the TLB 104 and TLB registers 108 is now described. The TLB registers 108 are used to store and recall data into and out of the TLB 104 by way of TLB instructions 112 (TLB software or commands). Typically, the TLB 104 facilitates mapping of virtual addresses into physical memory addresses. The TLB registers 108 provide a data pathway in which the TLB 104 is read, written, or probed. The exemplary TLB 104 illustrated in FIG. 1 provides an index of n page table entries corresponding to n mappings from virtual to physical memory. Each virtual address to a TLB references address translation data in the TLB 104 that is categorized by addressable sections of the TLB (i.e., page frame number fields). The addressable sections comprise a page table entry's page mask—MASK 116, virtual page number (or identifier)—VPN2 120, even physical page (or even page frame)—PFN0 124, or odd physical page (or odd page frame)—PFN1 128. The number of page table entries, n, may affect the performance of the TLB 104; however, the ability of the TLB 104 to cache a subset of page table entries may depend on the number of page table entries, n, of the TLB 104. It is contemplated that the size of n may be varied based on the types of applications or programs executed by a control processor. As illustrated, one or more corresponding registers 108 may be used to store or access the associated page mask, virtual page number, even or odd physical page data into the TLB sections or fields. An index register 132 is used to index the TLB for purposes of storing or accessing one of n page table entries within the TLB 104. A page mask register 136 is used to hold page size information when addressing the TLB 104. An entry Hi register 140 is used to hold virtual page numbers (VPN2) associated with the virtual page (or page frame numbers) indexed by a page table entry. Similarly, entry Lo0 144 and entry Lo1 148 registers are used to hold even and odd page frame numbers associated with a particular page table entry. The entry Lo0 register 144 is typically used to store even numbered page frame identifiers while the entry Lo1 register 148 is typically used to store odd numbered page frame identifiers. As shown in FIG. 1, odd and even page frame numbers are indexed in separate page frame number fields of the TLB 104.

Figure 2:
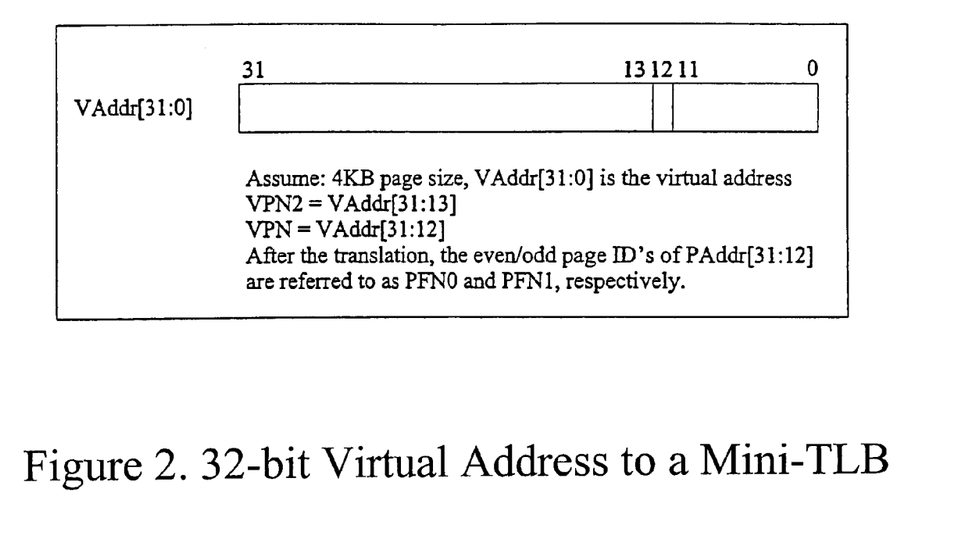
FIG. 2 illustrates a block diagram of an exemplary 32 bit virtual address format used in addressing a mini-TLB system in accordance with an embodiment of the invention.

FIG. 2 illustrates a block diagram of an exemplary 32 bit virtual address format used in addressing a mini-TLB accordance with an embodiment of the invention. As shown, the 32 bit virtual address is defined by bits ranging from [31:0]. In the embodiment shown, a page is identified as 4 Kbytes corresponding to 12 bits using addresses [11:0]. Exemplary page sizes range from 4 Kbyte to 16 Mbyte. In accordance with an embodiment of the invention, the entry Hi register in a mini-TLB provides a virtual page number (VPN) defined by bits [31:12] that corresponds to 4 Kbyte pages. It is contemplated that other page sizes may be used in other embodiments. In comparison, the typical TLB illustrated in FIG. 1 utilizes a virtual page number (VPN2) defined by virtual address bits [31:13]. The typical TLB also utilizes two page frame number fields, PFN1 and PFN0, which are defined by the virtual page number. However, aspects of the present invention comprise a mini-TLB utilizing a single PFN field as shown in FIG. 3.

Figure 3:
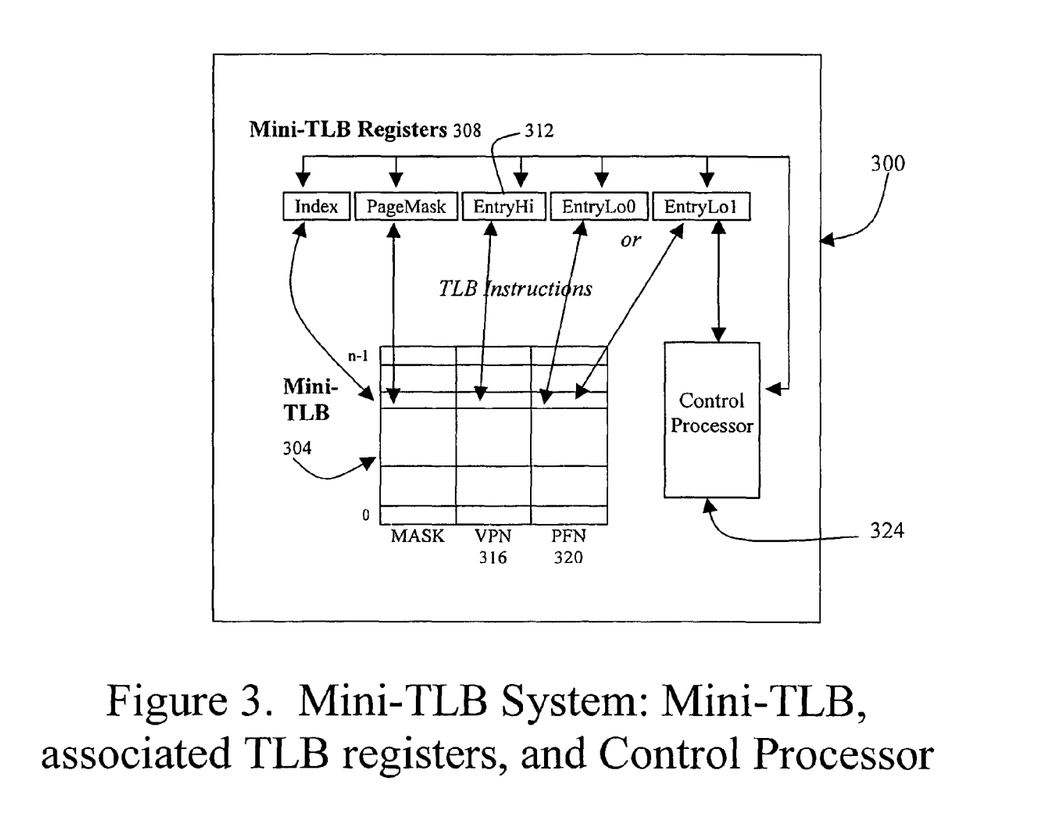
FIG. 3 is a relational block diagram illustrating an organizational structure of a mini-TLB system in accordance with an embodiment of the invention.

FIG. 3 is a relational block diagram illustrating an organizational structure of a mini-TLB system 300 in accordance with an embodiment of the invention. The mini-TLB system 300 comprises a miniature version of the previously mentioned translation lookaside buffer described in FIG. 1 (herein termed a mini-TLB 304) communicating with a number of mini-TLB registers 308 and a control processor 324. In one embodiment, the mini-TLB 304 is configured by way of instructions executed by the control processor 324. For the mini-TLB 304 shown in FIG. 3, the index and page mask registers function in the same manner as was described earlier in FIG. 1. In addition, virtual addressing is performed using the addressing format described in FIG. 2, in which a 32 bit virtual address is used. Of course, it is contemplated that in other embodiments, virtual addressing may be performed using more or less than 32 bits. In the embodiment shown, the entry Hi 312 register of FIG. 3 facilitates storage and read out of a virtual page number associated with bits [31:12] of the virtual addressing format discussed previously. Hence, as illustrated in FIG. 3, the virtual page number (VPN) may be either read from or written into a VPN field (or section) 316 of the mini-TLB 304. The VPN is associated with a page frame number (PFN) which is similarly either read from or written into a PFN field 320 of the mini-TLB 304 using the registers shown (i.e., entry Lo0 or entry Lo1 registers). In the embodiment illustrated in FIG. 3, only one of the entry Lo registers (either entry Lo0 or entry Lo1) is valid for use during a write operation; for example, the contents of a valid entry Lo register is written into the page frame number (PFN) field 320 associated with a specified page table entry of the mini-TLB 304. In one embodiment, the least significant bit (lsb) of a VPN (i.e., bit 12 of the 32 bit virtual address described) is used to determine whether the entry Lo0 or an entry Lo1 register contains valid data for writing into the PFN field 320 of the mini-TLB 304. Similar principles may be applied during a read from the mini-TLB 304. For example, the least significant bit (lsb) of the VPN may be used to determine which register, either entry Lo0 or entry Lo1, will be used to access valid page frame number data utilized by the control processor 324 during a read operation. In a read operation, for example, the least significant bit (lsb) of a virtual page number is used to store data into either the entry Lo0 register or the entry Lo1 register. In this fashion, both even and odd page frame numbers may be stored or recalled from a single page frame number field of the mini-TLB 304.

The mini-translation lookaside buffer (mini-TLB) and associated registers—index, page mask, entry Hi, entry Lo0, and entry Lo1, as described in FIG. 3, may conform to a MIPS (RISC) based architecture or any other similar type of architecture. The mini-TLB system illustrated in FIG. 3 may seamlessly utilize any existing control processor instruction set (e.g., a MIPS instruction set) in order to perform one or more processing operations. The following exemplary instructions may be used by a control processor in operating with the mini-TLB system:

TLBR (TLB Read)—reads contents from a page frame number (PFN) field of a mini-TLB entry (or page table entry) and transfers the contents into entry Lo0 or entry Lo1 registers. The mini-TLB entry is identified by contents of the Index register. When reading from the mini-TLB, only one of the entry Lo registers (either entry Lo0 or entry Lo1) has valid contents.

TLBWI (TLB Write)—writes contents of either entry Lo0 or entry Lo1 registers into a page frame number (PFN) field of a corresponding mini-TLB entry (or page table entry). The mini-TLB entry is identified by contents provided by the Index register. When writing to the mini-TLB, only one of the entry Lo registers (either entry Lo0 or entry Lo1) has valid contents. The entry Lo register with valid contents is written into the PFN field of the mini-TLB.

TLBWR (TLB Random Write)—writes contents of either entry Lo0 or entry Lo1 registers into a page frame number (PFN) field of a corresponding mini-TLB entry (or page table entry) in which the mini-TLB entry is identified by a random number generator.

TLBP (TLB probe)—probes or searches the virtual page number field of the TLB for a particular virtual page number as defined by the contents in the entry Hi register. Writes the page table entry number or location of the virtual page number into the Index register. One or more bit(s) in the Index register indicates the result of the probe or search.

Figure 4:
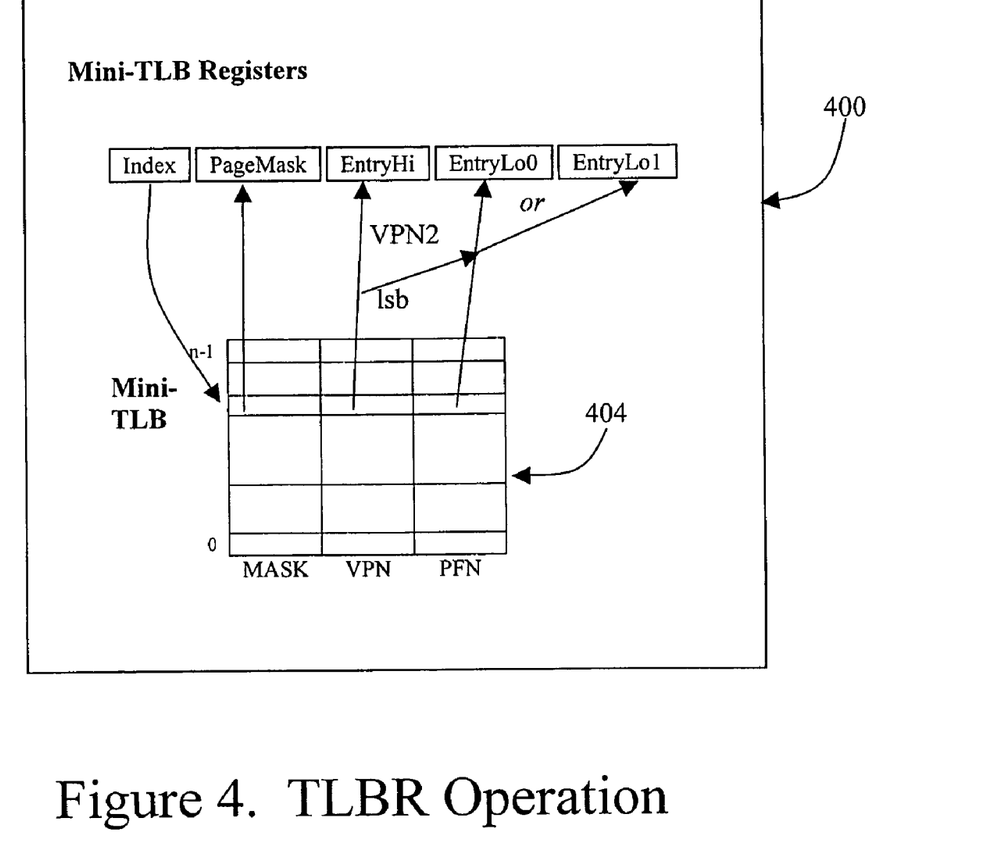
FIG. 4 is a relational block diagram illustrating an organizational structure of a mini-TLB system performing a read operation in accordance with an embodiment of the invention.

FIG. 4 is a relational block diagram illustrating an organizational structure of a mini-TLB system 400 performing a read (TLBR) operation in accordance with an embodiment of the invention. As illustrated in the diagram of FIG. 4, the least significant bit (lsb) of a particular VPN is used to determine whether the contents of the page frame number (PFN) is stored in either entry Lo0 or entry Lo1 registers. For example, if the lsb corresponds to the value 0 (signifying an even page), then the contents of the mini-TLB 404 located in the PFN field of a particular page table entry is accessed and written into the entry Lo0 register. However, if the lsb corresponds to the value 1 (signifying an odd page), then the contents of the mini-TLB 404 located in the PFN field of a particular page table entry is accessed and written into the entry Lo1 register. It is contemplated that these operations may be programmed by using one or more instructions provided by any existing instruction set (i.e., a MIPS instruction set). The contents of the page mask register is stored into the Mask field of the indexed mini-TLB page entry.

Figure 5:
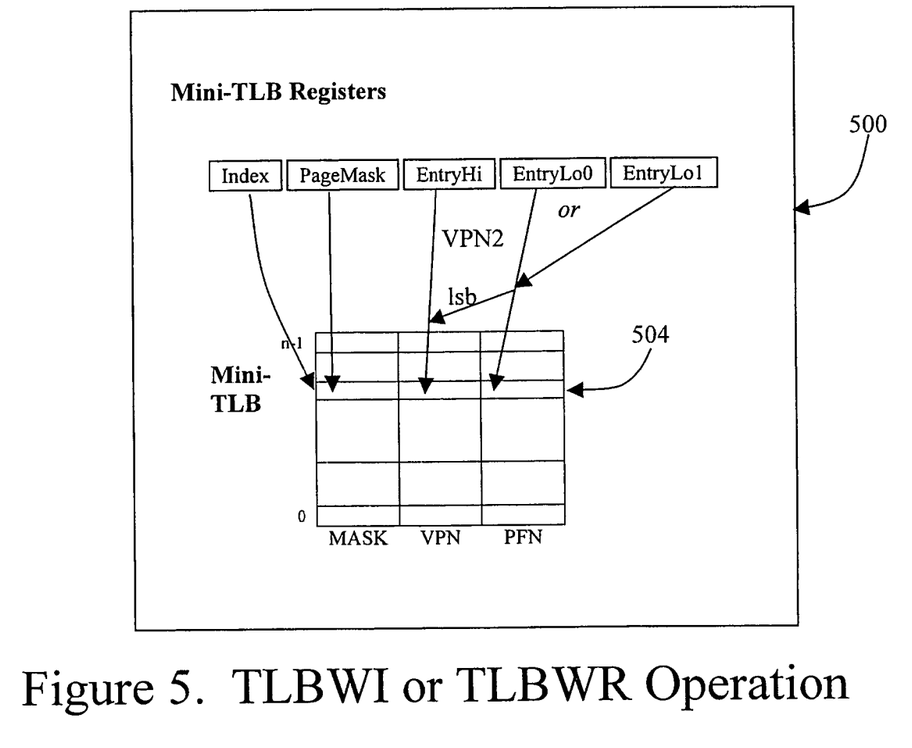
FIG. 5 is a relational block diagram illustrating an organizational structure of a mini-TLB system performing a write operation in accordance with an embodiment of the invention.

FIG. 5 is a relational block diagram illustrating an organizational structure of a mini-TLB system 500 performing a write (TLBWI) or random write (TLBWI) operation in accordance with an embodiment of the invention. In this embodiment, a control processor verifies, by performing one or more checks, whether the contents provided by entry Lo0 or entry Lo1 contains a valid PFN. It may perform this check by verifying the contents of the associated VPN stored in the virtual page number field corresponding to a particular page table entry in the mini-TLB 504. For example, the control processor may be programmed to verify the value of the lsb in the entry Hi register. If the value of the lsb in the entry Hi register is 0, the contents of the entry Lo0 register is written into the appropriate PFN field indexed by the mini-TLB page entry. If the value of the lsb in the entry Hi register equals the value 1, the contents of the entry Lo1 register is written into the appropriate PFN field as indexed by the mini-TLB page table entry. Thereafter, the contents of the page mask register is stored into the Mask field of the indexed mini-TLB page entry.

Figure 6:
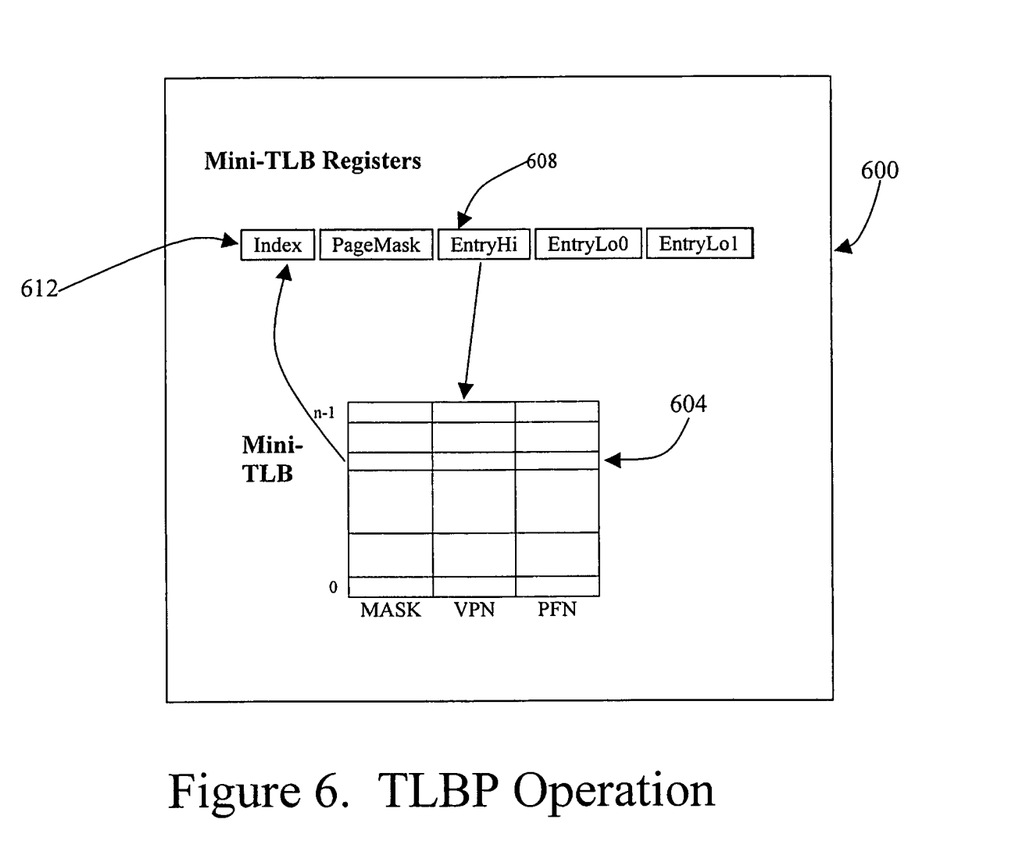
FIG. 6 is a relational block diagram illustrating an organizational structure of a mini-TLB system performing a probe or search operation in accordance with an embodiment of the invention.

FIG. 6 is a relational block diagram illustrating an organizational structure of a mini-TLB system 600 performing a probe or search (TLBP) operation in accordance with an embodiment of the invention. The probe operation is used to perform a search of a particular VPN in the mini-TLB 604. As shown in FIG. 6, one or more VPN fields are accessed by the entry Hi register 608 in order to locate the corresponding index entry in the mini-TLB 604. Should a match occur, the corresponding entry identification number is written into one or more least significant bit(s) (lsbs) of the index register 612. The most significant bit (msb) of the index register 612 is used to indicate whether the probe or search resulted in a hit or miss.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of improving the performance of address translation in a translation lookaside buffer comprising:
   using a bit obtained from a virtual page number to indicate whether a page frame number is even or odd; and
   consolidating even and odd page frame number fields into a single page frame number field of said translation lookaside buffer.

2. The method of claim 1 wherein said bit corresponds to a least significant bit of said virtual page number.

3. The method of claim 1 wherein said address translation of said translation look aside buffer is performed by way of using a control processor instruction set.

4. The method of claim 1 wherein said consolidating even and odd page frame number fields into said single page frame number field implements a translation lookaside buffer of reduced size.

5. A system to provide effective virtual to physical memory address translation comprising a buffer that uses a single page frame number field for storing odd/even page frame numbers.

6. The system of claim 5 wherein said buffer comprises a translation lookaside buffer of reduced size.

7. A system to provide virtual to physical memory address translation of a translation lookaside buffer comprising:
   a translation lookaside buffer, said translation lookaside buffer using a bit of a virtual page number of a virtual address for reading and writing odd and even page frame numbers using a single page frame number field of said translation lookaside buffer;
   a first register for mapping an even page frame number to said single page frame number field; and
   a second register for mapping an odd page frame number to said single page frame number field.

8. The system of claim 7 wherein using a single page frame number field implements a reduced size of said translation lookaside buffer.

9. The system of claim 8 wherein said virtual to physical memory address translation is performed by way of using TLB control processor instructions.

10. A method comprising:
    obtaining a bit obtained from a virtual page number of a virtual address;
    using said bit to determine which one of two storage registers will be used for:
    a) writing page frame number data from said one of two storage registers into an indexed entry of a single page frame number field of said translation lookaside buffer, said two storage registers comprising a first storage register used for writing even page frame numbers into said single page frame number field when said bit is a first value and a second storage register used for writing odd page frame numbers into said single page frame number field when said bit is a second value, or
    b) reading said page frame number data from said single page frame number field, said first storage register used to read said page frame number data when said bit is said first value, said second storage register used to read said page frame number data when said bit is said second value, said bit used to reduce size of said translation lookaside buffer by way of consolidating two page frame number fields of said indexed entry into a single page frame number field.

11. The method of claim 10 wherein said bit corresponds to a least significant bit of said virtual page number.

12. The method of claim 10 wherein said reading and said writing is performed by way of using a translation lookaside buffer (TLB) control processor instruction set.

13. The method of claim 12 wherein said TLB control processor instruction set comprises a MIPS control processor instruction set.

14. The method of claim 10 wherein said virtual address comprises 32 bits.

15. The method of claim 14 wherein said virtual page number is specified by bits [31:12] of said virtual address.

16. The method of claim 14 wherein said virtual address utilizes a page mask size ranging from 4 kilobytes to 16 megabytes.

17. The method of claim 16 wherein said page mask size comprises 4 kilobytes.

18. A method of performing a write operation using a translation lookaside buffer comprising:
    using a bit of a virtual page number, said virtual page number stored in a data register;
    assessing whether a value of said bit of a virtual page number is 0 or 1;
    writing a first page frame number stored in a first register to a page frame number field of an indexed entry of said translation lookaside buffer if said value is 0; and
    writing a second page frame number stored in a second register to said page frame number field of said indexed entry of said translation lookaside buffer if said value is 1, said indexed entry comprising a single page frame number field used to reduce the size of said translation lookaside buffer.

19. The method of claim 18 wherein said bit corresponds to the least significant bit of said virtual page number.

20. The method of claim 18 wherein a control processor is used to verify that said first page frame number and said second page frame number are valid.

21. A method of performing a read operation using a translation lookaside buffer comprising:
    using a bit of a virtual page number, said virtual page number stored in virtual page number field of said translation lookaside buffer;

assessing whether a value of a bit of a virtual page number is 0 or 1;

reading a page frame number stored in a page frame number field of an indexed entry of said translation lookaside buffer;

storing said page frame number into a first register if said value is 0; and storing said page frame number into a second register if said value is 1, said indexed entry comprising a single page frame number field used to reduce the size of said translation lookaside buffer.

22. The method of claim 21 wherein said bit corresponds to the least significant bit of said virtual page number.

23. A method of probing for a particular virtual page number of an entry in a translation lookaside buffer comprising:

using a virtual page number stored in a first register;

comparing said virtual page number to one or more values stored in one or more virtual page number fields of one or more corresponding entries in said translation lookaside buffer;

generating an identifying number associated with an entry of said one or more entries if a virtual page number field stores a value that is equal to said virtual page number; and storing said identifying number into a second register.

24. A translation lookaside buffer system comprising:

a translation lookaside buffer;

a first register used for storing a value that indexes an entry in said translation lookaside buffer, said entry comprising a virtual page number field and a single page frame number field;

a second register used for storing a page size of said entry;

a third register used for storing a virtual page number of said entry, said virtual page number comprising a bit;

a fourth register used for storing an even page frame number; and a fifth register used for storing an odd page frame number, said bit of said virtual page number used to determine whether said even page frame number or said odd page frame number is to be stored in said page frame number field in said translation lookaside buffer when performing a write operation, said bit of said virtual page number stored in said virtual page number field used to determine whether said even page frame number is to be stored in said fourth register or said odd page frame number is to be stored in said fifth register when performing a read operation, wherein use of said single page frame number field reduces a size of said translation lookaside buffer.

25. The method of claim 24 wherein said read and write operations are performed by way of using a translation lookaside buffer (TLB) control processor instruction set.

26. The method of claim 25 wherein said TLB control processor instruction set comprises a MIPS control processor instruction set.

27. The method of claim 24 wherein said virtual page number is defined by a 32 bit virtual address.

28. The method of claim 27 wherein said virtual page number is specified by bits [31:12] of said 32 bit virtual address.

29. The method of claim 27 wherein said bit comprises a least significant bit (lsb) of said virtual page number.

30. A reduced size translation lookaside buffer comprising:

a virtual page number field used to store a virtual page number;

a page frame number field used to store an even or an odd page frame number, said even or said odd page frame number indicated by a bit from said virtual page number.

31. The reduced size translation lookaside buffer of claim 30 wherein said bit corresponds to a least significant bit of said virtual page number.

32. The reduced size translation lookaside buffer of claim 30 wherein said virtual page number is defined by a 32 bit virtual address.

33. The reduced size translation lookaside buffer of claim 30 herein said virtual page number is specified by bits [31:12] of said 32 bit virtual address.

* * * * *